US008711091B2

(12) United States Patent
Nomura et al.

(10) Patent No.: US 8,711,091 B2
(45) Date of Patent: Apr. 29, 2014

(54) AUTOMATIC LOGICAL POSITION ADJUSTMENT OF MULTIPLE SCREENS

(75) Inventors: Ryohta Nomura, Kanagawa-Ken (JP); Susumu Shimotono, Kanagawa-Ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 190 days.

(21) Appl. No.: 13/273,476

(22) Filed: Oct. 14, 2011

(65) Prior Publication Data

US 2013/0093659 A1 Apr. 18, 2013

(51) Int. Cl.
 *G06F 3/01* (2006.01)
(52) U.S. Cl.
 USPC ............................................ 345/156; 345/1.3
(58) Field of Classification Search
 USPC .................. 345/156, 1.3, 3.1; 715/718
 See application file for complete search history.

(56) References Cited

U.S. PATENT DOCUMENTS

| | | | | |
|---|---|---|---|---|
| 6,100,857 A * | 8/2000 | Tani et al. | | 715/726 |
| 6,275,622 B1 * | 8/2001 | Krtolica | | 382/296 |
| 6,611,613 B1 * | 8/2003 | Kang et al. | | 382/118 |
| 6,967,632 B1 * | 11/2005 | Minami et al. | | 345/1.3 |
| 7,215,828 B2 * | 5/2007 | Luo | | 382/289 |
| 7,502,494 B2 * | 3/2009 | Tafuku et al. | | 382/118 |
| 7,675,478 B2 * | 3/2010 | Yamazaki | | 345/1.1 |
| 8,154,472 B2 * | 4/2012 | Yamaguchi et al. | | 345/1.1 |
| 2005/0168399 A1 * | 8/2005 | Palmquist | | 345/1.1 |
| 2006/0001593 A1 * | 1/2006 | Baudisch | | 345/1.1 |
| 2008/0055271 A1 * | 3/2008 | Yamaguchi et al. | | 345/173 |
| 2008/0238812 A1 * | 10/2008 | Xiang et al. | | 345/1.1 |
| 2009/0027337 A1 * | 1/2009 | Hildreth | | 345/158 |
| 2010/0053164 A1 * | 3/2010 | Imai et al. | | 345/427 |
| 2012/0182210 A1 * | 7/2012 | Chan et al. | | 345/156 |

FOREIGN PATENT DOCUMENTS

JP 2000-097676 7/2000

OTHER PUBLICATIONS

Microsoft, Inc., "Windows OS Multiple Monitors" http://support.microsoft.com/kb/307873/en-us?fr=1, 2011, pp. 1-4.
Avatron Software, Inc. "Air Display" http://itunes.apple.com/app/air-display/id368158927?ign-mpt=uo%3D6&mt=8, 2011, pp. 1-12.

* cited by examiner

*Primary Examiner* — Abbas Abdulselam
(74) *Attorney, Agent, or Firm* — Shimokaji & Assoc., P.C.

(57) ABSTRACT

A method and a computer system are provided for automatically setting the logical positions of multiple screen displays. A computer system may comprise a plurality of display devices, at least one image capturing device, and a controller. The controller may be coupled to the display devices and image capturing devices. The adjustment module may be adapted to adjust the plurality of the display settings.

20 Claims, 5 Drawing Sheets

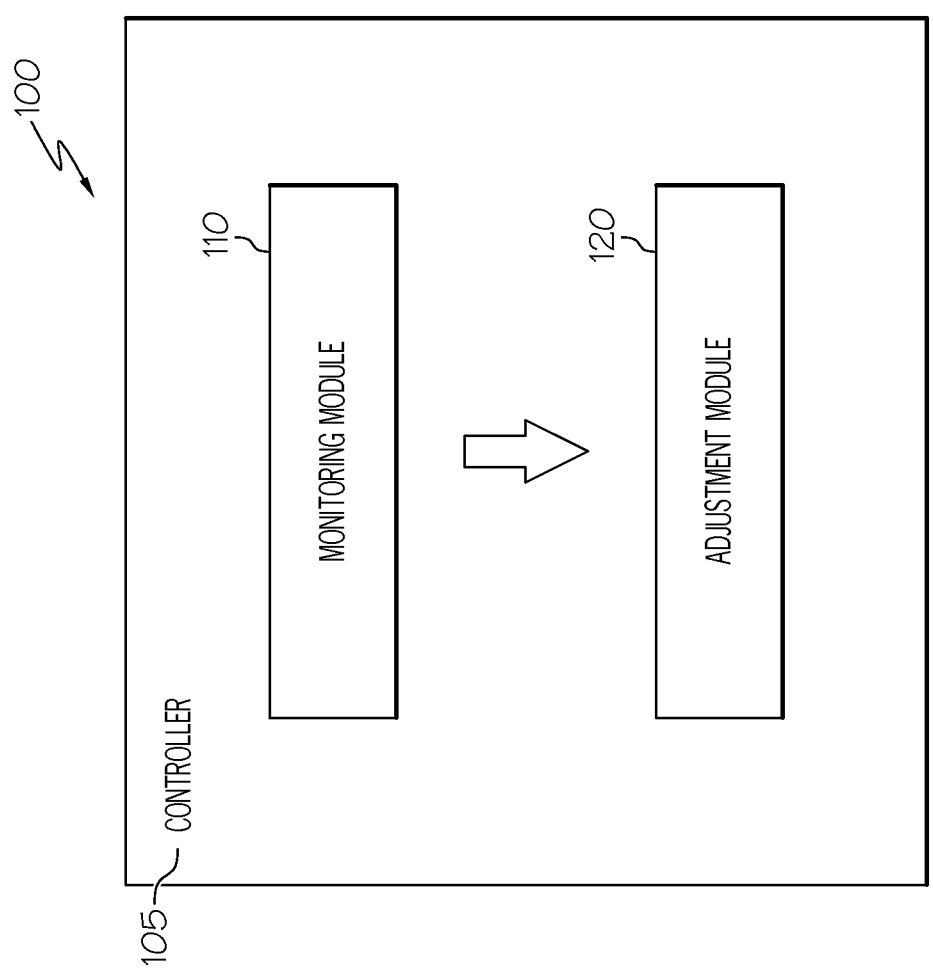

AUTOMATIC LOGICAL POSITION ADJUSTMENT OF MULTIPLE SCREENS

BACKGROUND OF THE INVENTION

The present invention relates generally to methods and systems for adjusting logical positions of multiple screen displays and, more specifically, to methods and systems for assessing the position of objects that facing displays such as a user's face and affecting the logical positions of multiple screen displays based on such assessments.

Multiple screen display computer systems, i.e., a computer system with more than one display or monitor, are becoming more prevalent. Their prevalence is due, in large part, to the fact that the typical graphic display subsystem provides support for more than one monitor and the cost for a second monitor is relatively small. Another factor is that a multiple screen computer system offers a computer user more area upon which information and work may be displayed. With a greater display area, the computer user may spend less time cycling through overlapping windows, frequently referred to as "thrashing," to find information that may lie hidden under the overlapping windows.

Most typical example of multiple screen displays is dual displays using a primary monitor and a secondary monitor. To arrange dual displays or monitors, users typically configure one monitor as a primary monitor, which displays the logon dialog box when a computer is started. A secondary monitor may be connected to a computer system associated with the primary monitor via a cable or wirelessly. As an example, the primary monitor is put on the right hand side and a secondary monitor is put on the left hand side in front of a user with a left edge of the primary monitor abutting the right edge of the secondary monitor. A logical position of the secondary monitor may be configured as a left monitor through a control panel of the computer system, for example. The logical position may refer to a computer setting to define relative physical positions of monitors.

When dual monitors are switched in positions, that is, in the above example, the primary monitor is put on the left hand side and a secondary monitor is put on the right hand side with a right edge of the primary monitor abutting a left edge of the secondary monitor, the logical positions of monitors have to be changed in the computer system accordingly. If not, users have to move mouse cursor from the primary monitor to the secondary monitor through the left edge of the primary monitor screen to the secondary monitor screen. It is not convenient for a user to change the logical positions of monitors in the computer system each time the monitors switch positions. When there are more than two monitors, it is difficult to configure the monitor settings.

Therefore, it can be seen that there is a need to automatically adjust the logical positions in a computer system when multiple monitors are used.

SUMMARY

In one aspect, a computer system comprises a plurality of display devices having at least one main display device and one secondary display device; a plurality of image capturing devices carried by the plurality of display devices; a controller coupled to at least one display device and the image capturing devices; and an adjustment module adapted to set logical positions of the plurality of display devices.

In another aspect, a method of setting a multiple screen computer system may comprise a plurality of display devices operatively associated with at least one computing device; capturing an object image; analyzing the object image; and setting logical positions of the plurality of display devices based on the analysis of the object image.

In a further aspect, a computer readable medium may have computer usable program code comprising computer program code configured to launch a sub-display application executing an object recognition (e.g. face recognition) program; and computer program code configured to set logical positions of the plurality of display devices according to the object images received by the object recognition program.

These and other features, aspects and advantages of the present invention will become better understood with reference to the following drawings, description and claims.

BRIEF DESCRIPTION OF THE DRAWINGS

FIG. 1 is a block diagram of an exemplary embodiment of a computer system having a multiple-screen display;

DETAILED DESCRIPTION OF EMBODIMENTS

Figure 2A:
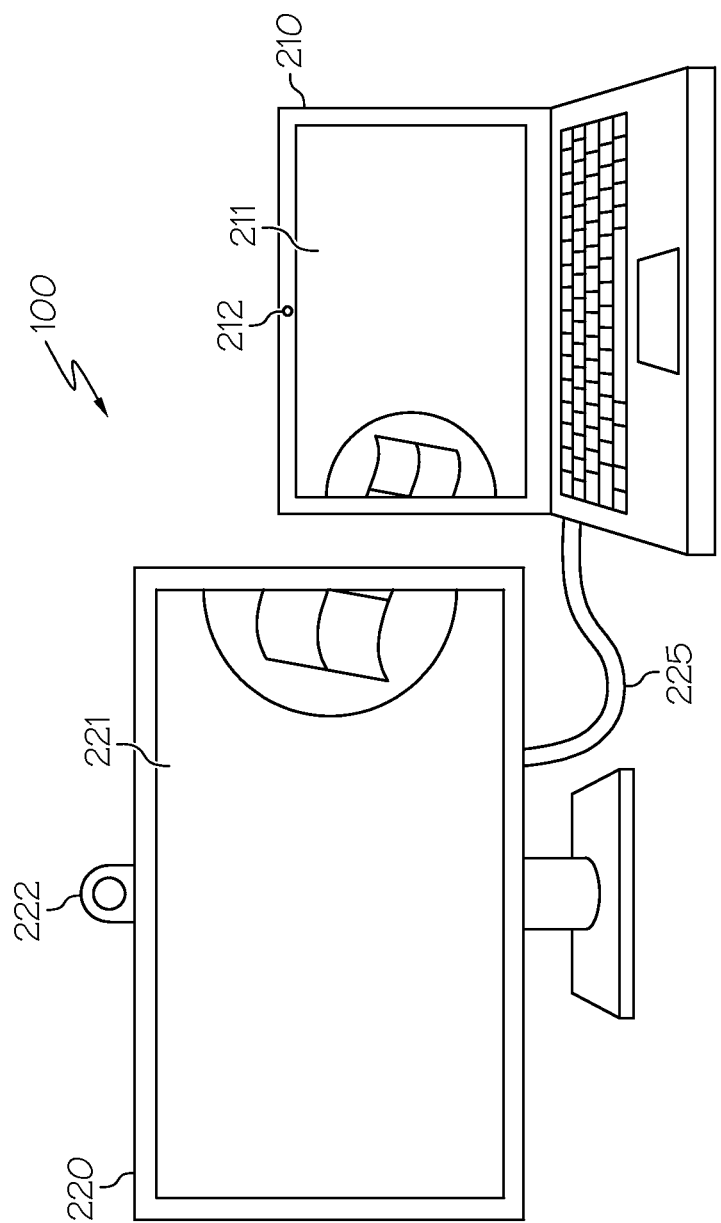
FIG. 2A is a front view of an exemplary embodiment of a computer system having a secondary monitor connected to a main monitor by a cable.

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments provide methods and systems for detecting and setting multiple-screen displays. When two or more monitors are connected to a computer, the computer provides a monitor setting (logical position adjustment) to describe the physical position of the monitors relative to each other. The exemplary embodiments may use an image capturing device that captures a face image of a user in front of the multiple-screen displays. Face recognition technology may be used to detect the position of an eye or nose by analyzing brightness. The face recognition technology may further be used to calculate face orientation. This may allow for automatic logical position adjustment of the multiple screen displays based upon captured face images and calculated face orientation. Exemplary embodiments optimize the user-friendliness of communication devices from a screen display perspective. In exemplary embodiments, multiple-screen displays may be set according to their physical orientation relative to the user.

Exemplary embodiments may include a controller which is coupled to at least one display device and at least one image capturing device. The controller may comprise a monitoring module and an adjustment module. The monitoring module may capture and analyze an object image, such as a user's face. The adjustment module may be adapted to set the logical positions of a plurality of display devices.

Exemplary embodiments may take the form of an entire hardware embodiment, an entire software embodiment (including firmware, resident software, micro-code, etc.) or an embodiment combining software and hardware aspects that may all generally be referred to herein as a "circuit," "module" or "system." Furthermore, exemplary embodiments may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction performance system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wired, wire line, optical fiber cable, radio frequency (RF), and the like.

Computer program code for carrying out operations of exemplary embodiments may be written in any combination of one or more programming languages, including an object oriented programming language such as Java™ Smalltalk™, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a multiple-screen display system 100 may comprise a controller 105, which includes a monitoring module 110 and an adjustment module 120. The monitoring module 110 may capture and analyze an object image, such as a user's face. The adjustment module 120 may be adapted to set logical positions of a plurality of display devices.

FIG. 2A refers to an exemplary embodiment of a multiple-screen display system 100, which has a controller 105 (not shown), a monitoring module 110 (not shown), and an adjustment module 120 (not shown) as shown in FIG. 1. The multiple-screen display system 100 may comprise a computer, such as a notebook PC 210, and a secondary monitor 220. The notebook PC 210 may include a main monitor 211, the controller 105 and an image capturing device, such as a built-in camera 212 on the main monitor 211. The secondary monitor 220 may include a screen 221 and a built-in camera 222. The secondary monitor 220 may be connected to the notebook PC 210 via a cable 225 to the main monitor 211.

Figure 2B:
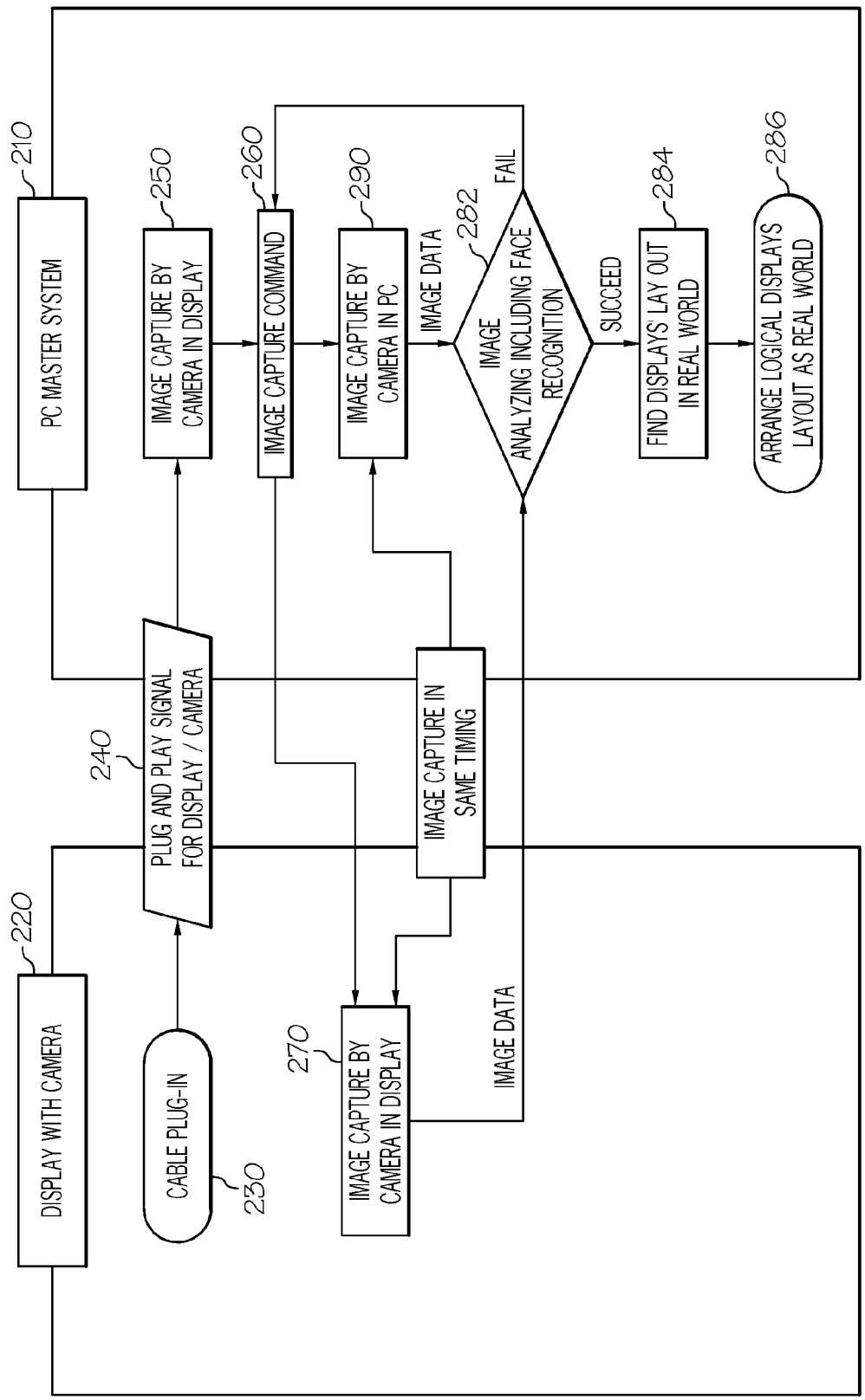
FIG. 2B is a flow chart illustrating steps of a method of setting multiple screen logical positions when multiple screens are connected via a cable.

Referring to FIG. 2B, in an exemplary method of setting multiple screen logical positions when multiple screens are connected via a cable, a step 230 may involve a secondary monitor (e.g., secondary monitor 220) being connected to a notebook PC (e.g., notebook PC 210). In a step 240, the secondary monitor (also known as a plug-and-play device, for example), may send a signal to the notebook PC. In a step 250, the connection of the plug-and-play device to the notebook PC may be detected by the operating system of the notebook PC. In a step 260, a controller (e.g., controller 105) may send a command to a monitoring module (e.g., monitoring module 110), which in turn may send an image capturing command to the secondary monitor and the main monitor.

In a step 270, a camera (e.g., camera 222) on the secondary monitor may capture an object image, such as a face image of a user. In a step 290, the camera on the main monitor may capture the same object image at the same time. The monitoring module may receive the images captured both from the camera of the secondary monitor and the camera of the main monitor. The images from the camera of the secondary monitor may comprise the position, size, and the angle of the face image of the user. The image from the camera of the main monitor may include the position, size, and the angle of the face image of the user.

In a step 282, the monitoring module may analyze the images of the user and angles of the cameras on the screen displays. The analysis may include running face recognition process. The face recognition process may include steps of extracting the face image of the user from each image captured from each camera of each monitor and analyzing the brightness and direction of the face. More specifically, the face recognition process may detect an eye position in the vertical direction from the image frame and detect a nose position in the horizontal direction based on the detected eye position. The face recognition process may compare detecting results with a table and determine the face orientation.

By comparing the images, monitoring module may analyze the relative position of each monitor. In a step 284, if the monitoring module determines the locations and sizes of a face of the user in analyzing the face image of the user, the monitoring module may determine the displays' physical layout, such as the secondary monitor situating either at the left of the main monitor or at the right of the main monitor in front of a user, for example. The displays' physical layout may be determined by comparing the orientation of the face images obtained from the cameras on the main monitor and the secondary monitor. When orientation of the face image obtained from the camera on the secondary monitor is oriented to the left more than the orientation of face image from camera on the main monitor, the monitoring module may determine that the secondary monitor is situated on the left hand side in physical layout relative to the main monitor in front of the user. When the orientation of face image from the camera on the secondary monitor is oriented to the right more than that from the main monitor, the monitoring module may determine that the secondary monitor is situated on the right hand side relative to the main monitor in front of the user. If the monitoring module fails to analyze the face image of the user or fails to determine the locations and sizes of the face of the user due to various reasons, such as a dark background or not enough images captured by the camera, in the step 260, the monitoring module may send another image capturing command to the main monitor and the secondary monitor until the monitoring module has succeeded in determining the locations and sizes of a face of the user in the face recognition process. Then in a step 286, an adjustment module (e.g., adjustment module 120) may adjust the monitor settings of the notebook PC such that the logical positions of the monitors match the physical arrangement of the monitors.

Figure 3A:
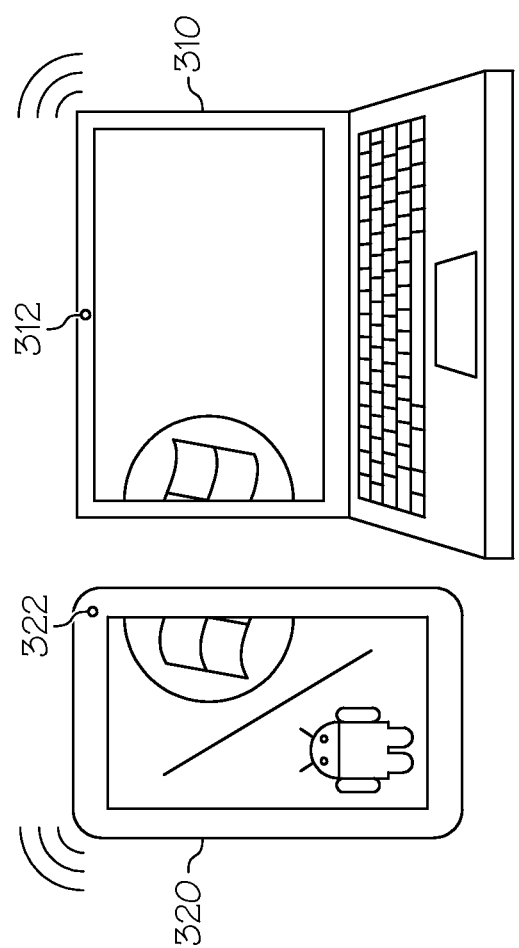
FIG. 3A is a front view of an exemplary embodiment of a computer system having a wireless secondary display.

FIG. 3A refers to another exemplary embodiment of a multiple-screen display system 100, which may comprise a controller 105 (not shown), a monitoring module 110 (not shown), and an adjustment module 120 (not shown), as shown in FIG. 1. The multiple-screen display system 100 may comprise a notebook PC 310, and a secondary monitor 320, such as a tablet PC or a smart phone with a smart display (e.g., iPad®), for example. The notebook PC 310 may include an embedded camera 312 and the controller 105. The secondary monitor 320 may have an embedded camera 322 and a monitoring module 110.

Figure 3B:
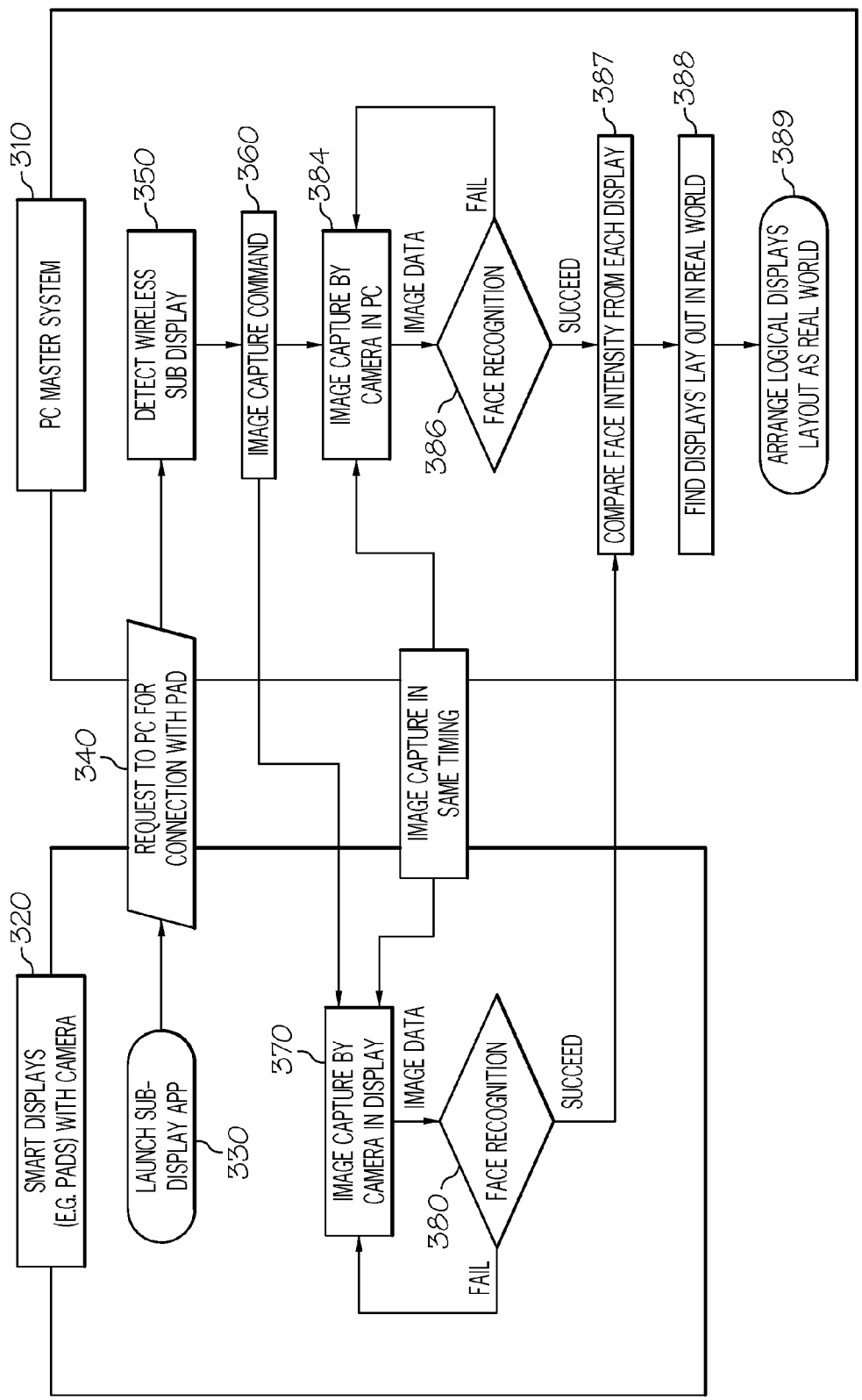
FIG. 3B is a flow chart illustrating steps of a method of setting multiple screen logical positions when multiple screens are connected wirelessly.

Referring to FIG. 3B, a secondary monitor (e.g., secondary monitor 320) may be connected to a notebook PC (e.g., notebook PC 310) wirelessly. In a step 330, the secondary monitor may launch a sub-display application. In a step 340, the secondary monitor may request the notebook PC for connection with the secondary monitor. In a step 350, a controller (e.g., the controller 105) in the notebook PC may detect the secondary monitor (or sub-display). In a step 360, the controller may send an image capturing command to the secondary monitor and the notebook PC.

In a step 370, a camera (e.g., camera 322) on the secondary monitor may capture an object image, such as a face image of a user. In a step 384, the camera on the notebook may capture the same face image of the user at the same time. The image from the camera of the secondary monitor may include the position, size, and the angle of the face image of the user.

In a step 380, a monitoring module (e.g., monitoring module 110) in the secondary monitor may analyze the image data from the camera and run face recognition. If the face recognition fails to determine the locations and sizes of the face of the user due to various reasons, such as a dark background or not enough images captured by the camera, in the step 370, the monitoring module may send a command to recapture images. Images may be recaptured by the camera. If the face recognition succeeds in determining the locations and sizes of the face of the user, the monitoring module may send face recognition results to the notebook PC for comparison with results from face recognition from the PC.

In a step 386, the monitoring module in the notebook PC may analyze the image data from the camera and run the face recognition program. If the face recognition fails to determine the locations and sizes of the face of the user due to various reasons, such as a dark background or not enough images captured by the camera, in the step 384, the monitoring module may send a command to recapture the images of a user's face by the camera in the notebook PC. If the face recognition succeeds in determining the locations and sizes of the face of the user, in a step 387, the monitoring module may compare face intensity of the user from each monitor.

By comparing the face intensity of the user, monitoring module of the notebook PC may determine the displays' physical layout, such as the secondary monitor situating either at the left of the notebook PC or at the right of the notebook PC, for example. In a step 389, an adjustment module (e.g., adjustment module 120) in the notebook PC may adjust the monitor settings of the notebook PC such that the logical positions of the notebook PC and the monitor match the physical arrangement of the notebook PC and monitor.

Alternatively, if there is no monitoring module existing in the secondary monitor, that is, if smart displays do not have a face recognition program, in the step 386, images captured by camera in the secondary monitor may be sent to the notebook PC without going through the step 380 and step 387. The process may proceed as described in FIG. 2B.

It should be understood, of course, that the foregoing relate to exemplary embodiments of the invention and that modifications may be made without departing from the spirit and scope of the invention as set forth in the following claims.

We claim:

1. A computer system comprising:
   a plurality of display devices having at least one main display device and one secondary display device;
   an image capturing device carried by the plurality of display devices;
   a controller coupled to the main display device and to the image capturing devices, the controller adapted to direct that an image capturing command be sent to the image capturing devices to capture an image of the same object at approximately the same time;
   a monitoring module coupled to the main display device and adapted to:
      receive the captured images from the image capturing devices;
      compare an orientation of the images of the object in the captured images; and
      based upon the comparison, determine the relative physical arrangement of the plurality of display devices; and an adjustment module adapted to set logical positions of the plurality of display devices based on the determined relative physical arrangement of the plurality of display devices.

2. The computer system of claim 1, wherein the secondary display device is adapted to connect to a main display device via a cable.

3. The computer system of claim 1, wherein the secondary display device is adapted to connect to a main display device wirelessly.

4. The computer system of claim 1, wherein the object image is a face of a user.

5. The computer system of claim 1, wherein the secondary display device comprises a smart phone, or a tablet computer.

6. The computer system of claim 4, wherein the comparison of the orientation of the images is based upon features of the face.

7. A method of setting a multiple screen computer system comprising a plurality of display devices operatively associated with at least one computing device, the method comprising:
 capturing an image of an object with a plurality of image capturing devices at approximately the same time, each operatively associated with one of the plurality of display devices;
 comparing an orientation of the image of the object in the captured images;
 based upon the comparison, determining the relative physical arrangement of the plurality of display devices; and
 setting logical positions of the plurality of display devices based on the relative physical arrangement of the plurality of display devices.

8. The method of claim 7, further comprising comparing the object images captured by an image capturing device on each of the plurality of display devices.

9. The method of claim 7, further comprising sending a request to an image capturing device of each display device to capture the object image.

10. The method of claim 7, further comprising extracting the object image from each captured image.

11. The method of claim 7, further comprising launching a sub-display application.

12. The method of claim 7, wherein:
 the object image is a face of a user; and
 the comparison of the orientation of the images is based upon features of the face.

13. The method of claim 7, wherein the logical positions corresponding to a projection of a first screen display on one of the plurality of displays and to a projection of a second screen display on another of the plurality of displays.

14. A non-transitory computer readable medium having computer usable program code embodied therewith, the computer program code comprising: computer program code configured to launch a sub-display application executing a face recognition program; and computer program code configured to set logical positions of objects displayed on a plurality of display devices to match a physical arrangement of the plurality of display devices based on face images received by the face recognition program.

15. The computer program code of claim 14, further comprising computer program code configured to send a request to an image capturing device of each display device to capture the face images.

16. The computer program code of claim 14, further comprising computer program code configured to capture the face images of a user by using an image capturing device.

17. The computer program code of claim 14, further comprising computer program code configured to extract the face images of a user.

18. The computer program code of claim 14, further comprising computer program code configured to analyze features of the face images of a user.

19. The computer program code of claim 18, further comprising computer program code configured to compare the features of the face images of a user from an image capturing device on each of a plurality of the display devices at approximately the same time.

20. The computer program code of claim 19, further comprising computer program code configured to determine a relative position of the plurality of display devices based upon the comparison.

* * * * *